United States Patent
Lee

[19]

[11] Patent Number: 6,106,057
[45] Date of Patent: Aug. 22, 2000

[54] VENTILATION BABY SEAT

[76] Inventor: Shih-Ping Lee, 6F, No. 200-2, Pei-Tun Rd., Taichung City, Taiwan

[21] Appl. No.: 09/401,543

[22] Filed: Sep. 22, 1999

[51] Int. Cl.[7] .................................................. A47C 31/00
[52] U.S. Cl. .............................. 297/180.14; 297/250.1; 297/256.15; 297/452.42
[58] Field of Search ........................... 297/250.1, 256.15, 297/464, 487, 488, 180.1, 180.13, 180.14, 452.46, 452.42; 454/120, 907

[56] References Cited

U.S. PATENT DOCUMENTS

| | | |
|---|---|---|
| 2,493,303 | 1/1950 | McCullough . |
| 2,544,506 | 3/1951 | Kronhaus . |
| 2,782,834 | 2/1957 | Vigo . |
| 3,137,523 | 6/1964 | Karner . |
| 4,589,656 | 5/1986 | Baldwin . |
| 5,626,386 | 5/1997 | Lush . |
| 5,626,387 | 5/1997 | Yeh . |
| 5,655,817 | 8/1997 | Nienow . |
| 5,685,604 | 11/1997 | Kain . |
| 5,897,162 | 4/1999 | Humes et al. . |
| 5,927,817 | 7/1999 | Ekman et al. . |

*Primary Examiner*—Milton Nelson, Jr.
*Attorney, Agent, or Firm*—Rosenberg, Klein & Lee

[57] ABSTRACT

A ventilation baby seat includes a hollow body having a recessed surface on the top thereof and two side walls extend from two sides of the body. A hole is defined through one of the two side walls and communicates with an interior in the body so that a ventilator is engaged with the hole in the body. The recessed surface of the body has a plurality of apertures defined therethrough so that when the ventilator is actuated, air flows through the apertures. A retaining member is removably connected between the two side walls of the body to prevent the baby or the kid sitting in the body from dropping.

11 Claims, 9 Drawing Sheets

VENTILATION BABY SEAT

FIELD OF THE INVENTION

The present invention relates to a baby seat having a hollow interior and a ventilation device connected to the seat so as to provide a ventilation feature for the user sitting in the seat which has apertures defined therethrough.

BACKGROUND OF THE INVENTION

A conventional baby seat is a curved frame having a seat portion and a backrest portion which integrally extends from the seat portion, a retaining bar removably connected between two sides of the backrest portion so as to retain the baby in the baby seat. A foam pad with a fabric enclosing the pad is put on the surface of the seat portion and the backrest portion of the baby seat so that the baby or kid sitting in the seat may feel comfortable. However, for the baby seat, there has no ventilation device to ventilate the seat itself and the baby or kid is retained in the seat so that he/she could feel uncomfortable especially when the car is exposed under the sunshine with all the doors and windows closed. If the baby or kid in the baby seat feels uncomfortable, the baby or kid will cry and this affects the concentration of the driver.

The present invention intends to provide a baby seat used in a car wherein the seat has a ventilation device connected thereto, a plurality of apertures defined through the casing of the hollow seat frame so that air flows via the apertures and the heat between the body of the baby or kid is dispensed by the air flow. The present invention has arisen to mitigate and/or obviate the disadvantages of the conventional baby seat.

SUMMARY OF THE INVENTION

In accordance with one aspect of the present invention, there is provided a ventilation baby seat comprising a hollow body having a recessed surface on the top of the body and two side walls extending from two sides of the body. The body has a hole in a side thereof so as to engage a ventilator with the hole. The recessed surface of the body has a plurality of apertures defined therethrough so that air flow caused by the ventilator will flow through the apertures to let the baby or kid sitting in the baby seat feel comfortable.

The primary object of the present invention is to provide a baby seat with a ventilation feature so that heat between the sitter and the baby seat will be dispensed.

These and further objects, features and advantages of the present invention will become more obvious from the following description when taken in connection with the accompanying drawings which show, for purposes of illustration only, several embodiments in accordance with the present invention.

DETAILED DESCRIPTION OF THE PREFERRED EMBODIMENTS

Figure 1:
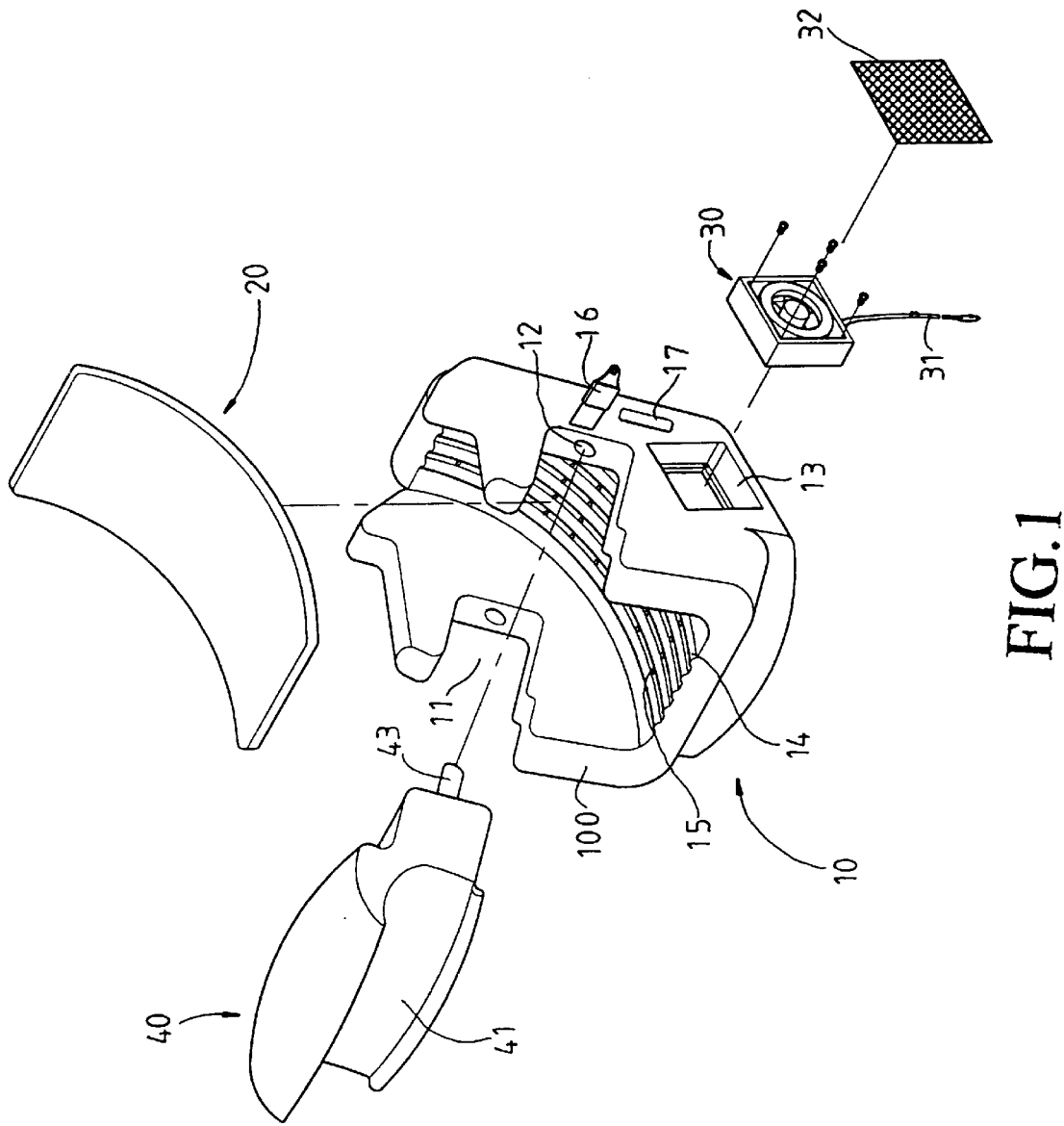
FIG. 1 is an exploded view of the baby seat in accordance with the present invention.
Figure 2:
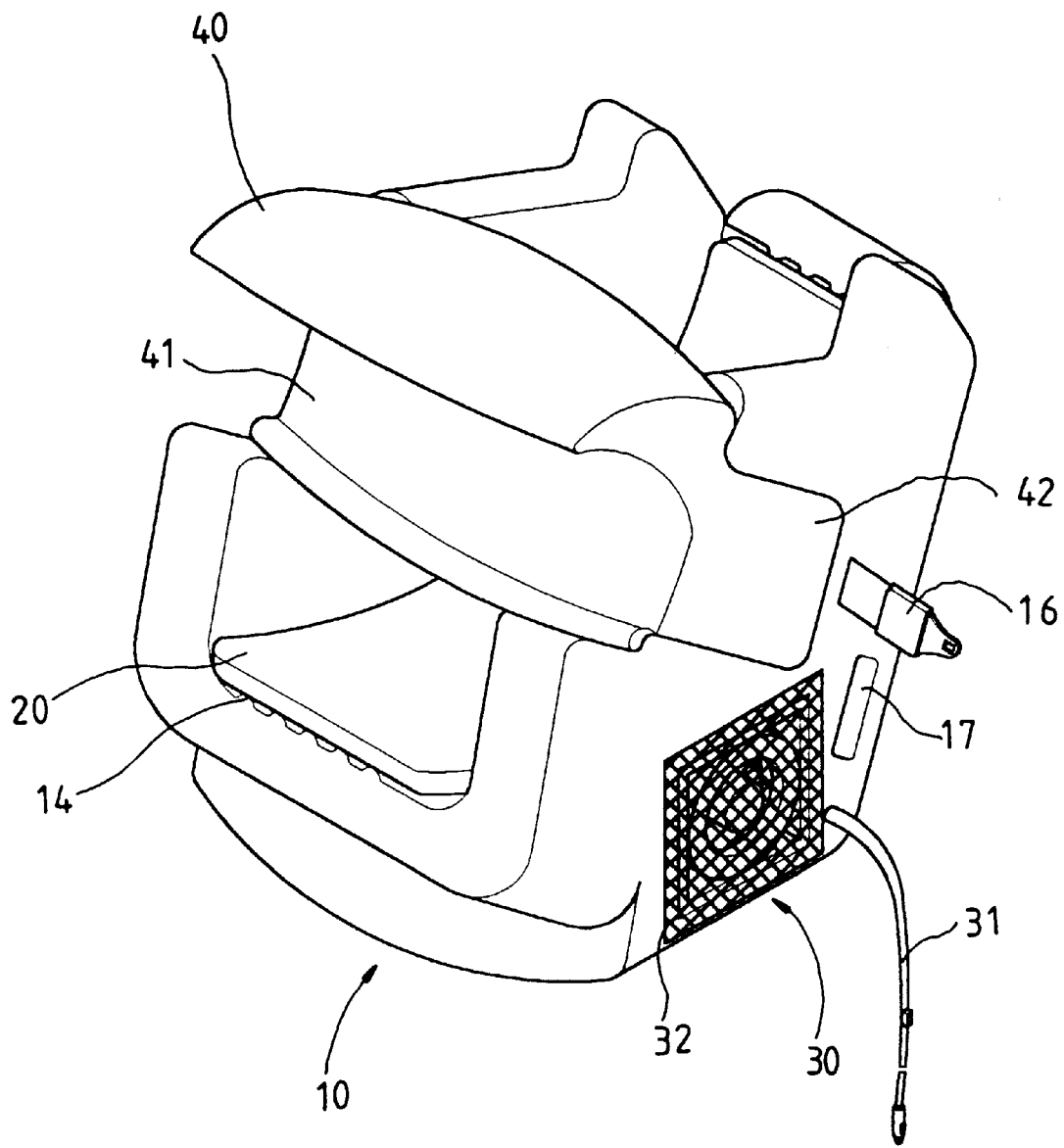
FIG. 2 is a perspective view of the baby seat in accordance with the present invention.

Referring to FIGS. 1 to 4, the ventilation baby seat in accordance with the present invention comprises a hollow body 10 having a recessed surface on the top thereof and a plurality of ridges 14 extend from the recessed surface. A plurality of apertures 15 are defined through the body 10 and located between the ridges 14. Two side walls 100 extend from two sides of the body 10 and each side wall 100 has a notch 11 defined therein so as to form an arm rest which defines the notch 11. The two side walls 100 each have an engaging hole 12 defined in a front end thereof and a slot 17 is defined in each side wall 100. The slot 17 is located on a rear end of the side wall 100 so that the baby seat can be fixed by extending a belt or the like (not shown) through the slot 17. A hole 13 is defined through one of the two side walls 100 and communicates with an interior in the body 10 so that a ventilator 30 is engaged with the hole 13 in the body 10. The ventilator 30 is powered via a wire 31 which is able to be plugged in the cigarette lighter in the car. A cover 32 is mounted to the hole 13 in the body 10 to enclose the ventilator 30 in the hole 13. A fastening buckle 16 extends from one of two side walls 100 of the body 10 so as to be engaged with the safety belt system in the car. A pad 20 is put on the recessed surface of the body 10 and has a serrated surface which provides a comfortable feature for the user.

Figure 3:
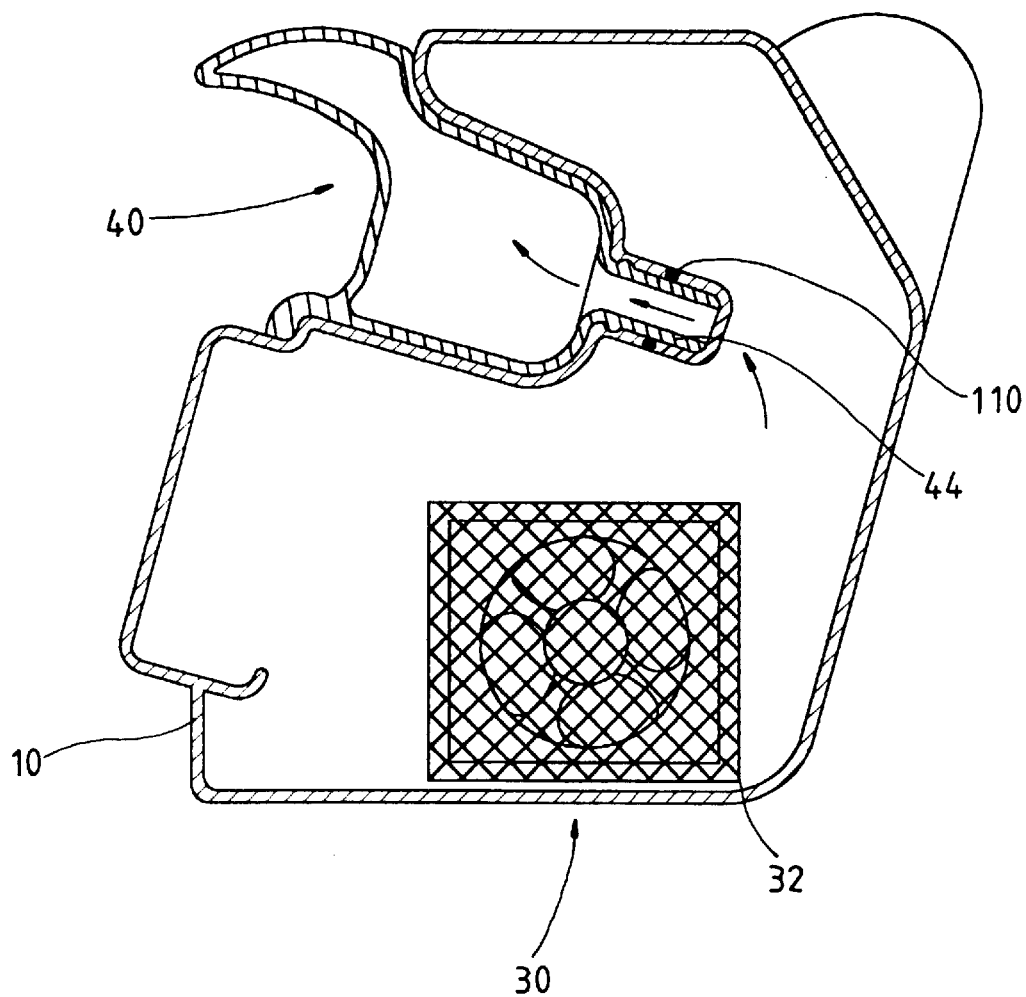
FIG. 3 is a side elevational view, partly in section, of the baby seat in accordance with the present invention, wherein the engaging holes are sealed by seals mounted to the insertions of the retaining member.
Figure 4:
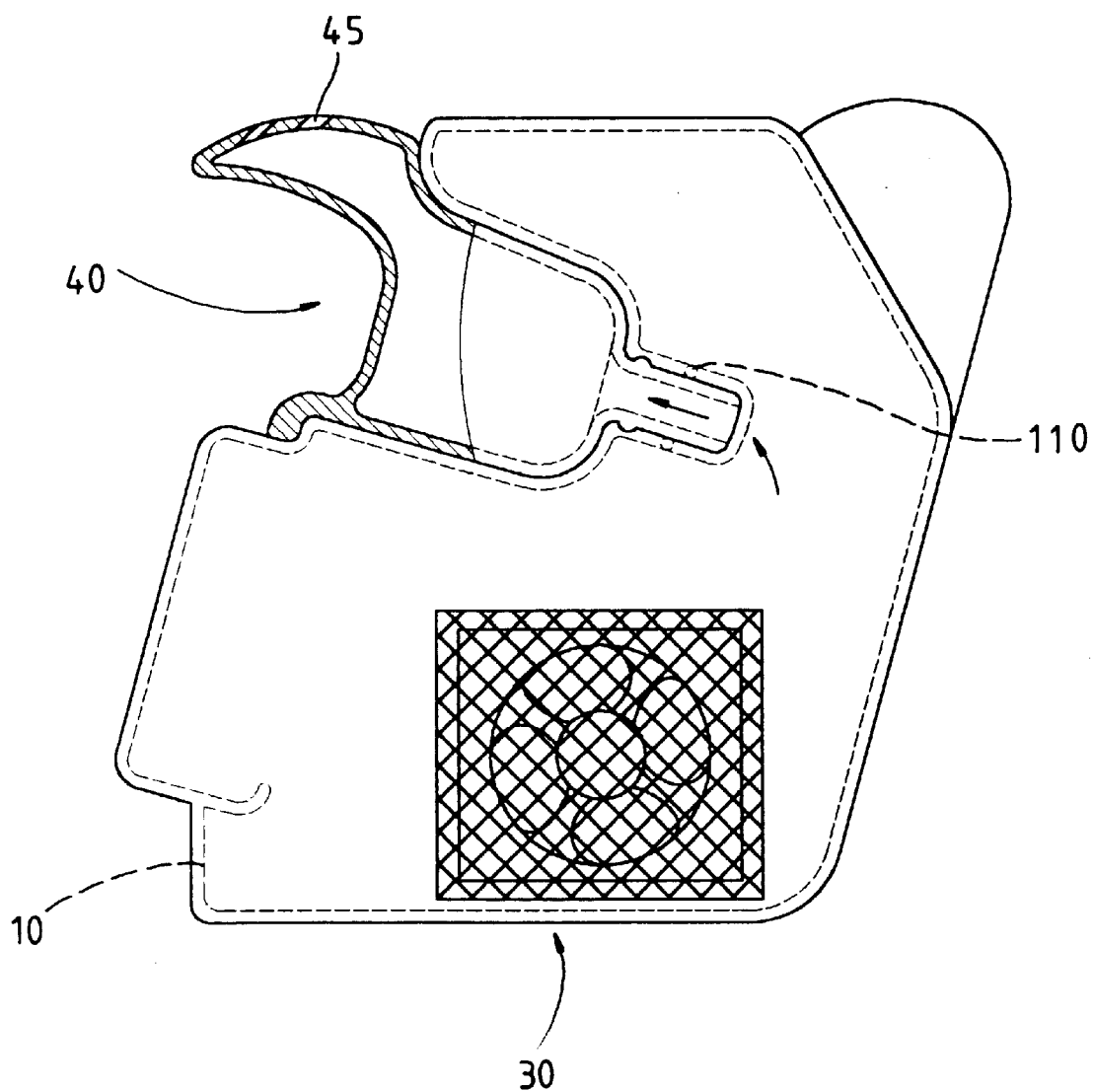
FIG. 4 is a side elevational view, partly in section, of the baby seat in accordance with the present invention, wherein the air flow caused by the ventilator flows through the holes in the retaining member.
Figure 5:
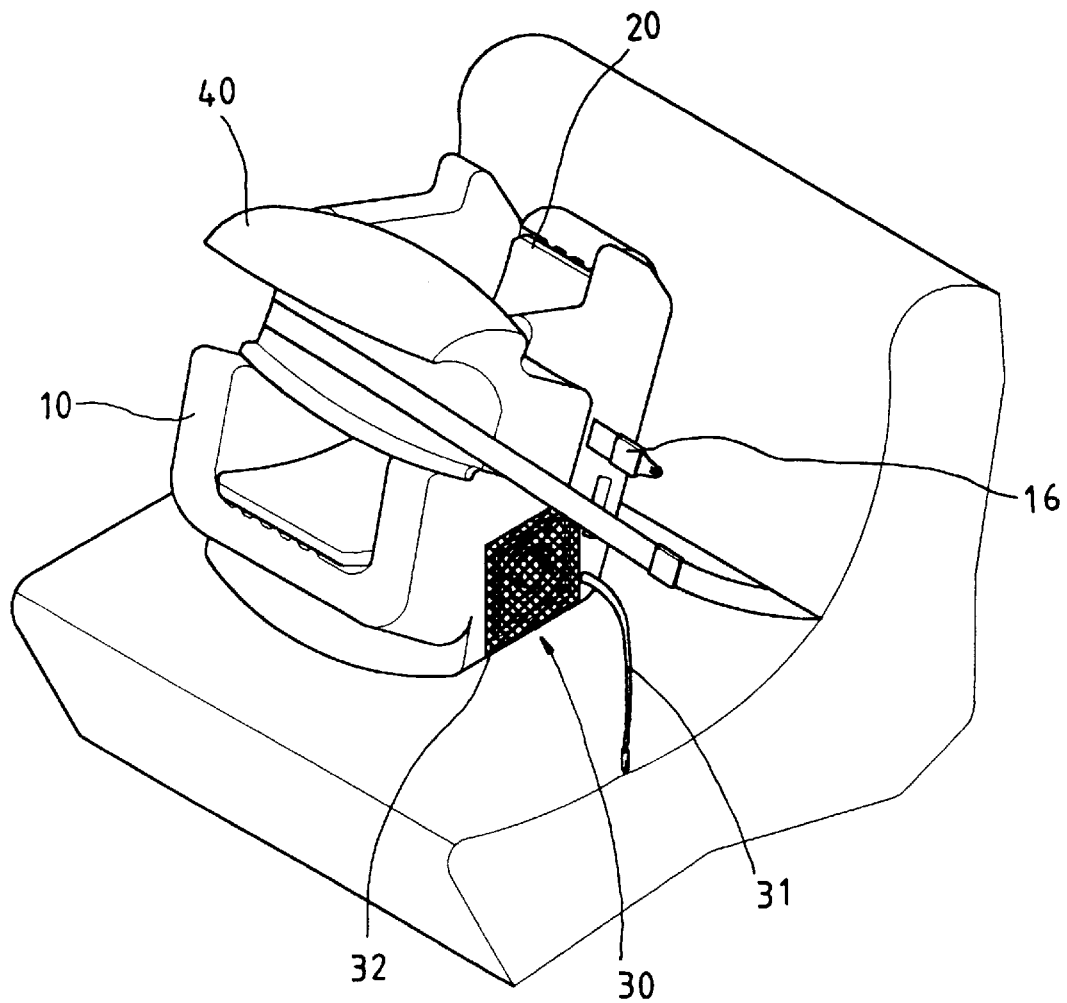
FIG. 5 is a perspective view of the baby seat secured on a rear bench in a car by safety belt of the car.
Figure 6:
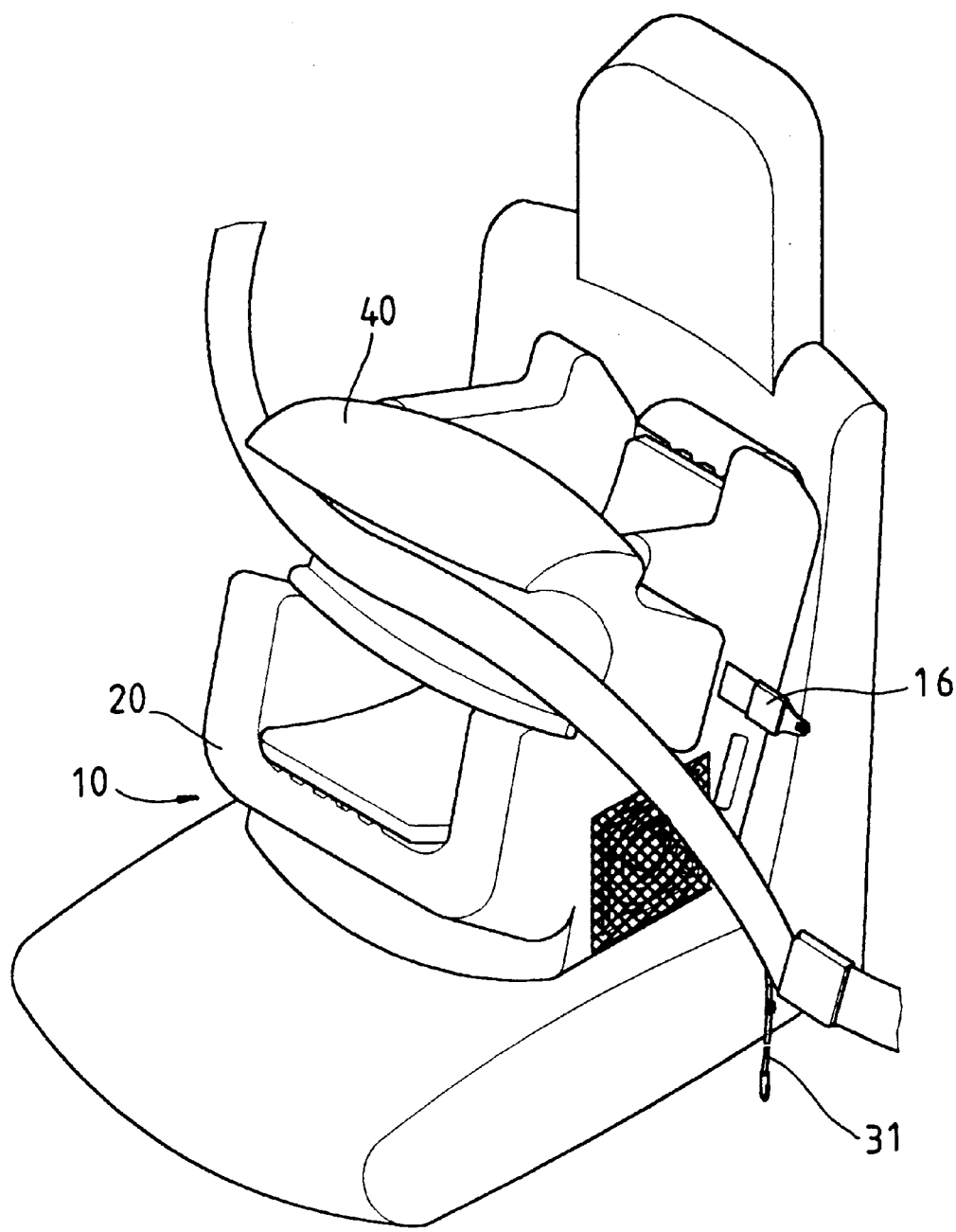
FIG. 6 is a perspective view of the baby seat secured on a front seat in a car by safety belt of the car.

A retaining member 40 has two insertions 43 extend from a first end of the retaining member 40 and the insertions 43 are removably engaged with the engaging holes 12. A groove 41 is defined in a second end of the retaining member 40 so that safety belt of the car can be engaged with the groove 41 as shown in FIGS. 5 and 6. FIG. 5 shows that the baby seat is secured on a rear bench in the car by safety belt and FIG. 6 shows that the baby seat is secured on a front seat in a car by safety belt of the car. The retaining member 40 is a hollow member and each insertion 43 has a seal member 110 mounted thereto so as to seal the engaging hole 12 when the insertions 43 are inserted into the engaging holes 12 as shown in FIG. 3. As shown in FIG. 4, an inlet 44 is defined in a distal end of each insertion 43 and a plurality of holes 45 are defined in a top of the retaining member 40. The retaining member 40 also has a fabric enclosed thereto. Therefore, when the ventilator 30 is actuated, the air flow resulted from the ventilator 30 will flows through the holes 45 in the retaining member 40 and the through apertures 15 to let the baby or kid sitting in the baby seat feel cool.

Figure 7:
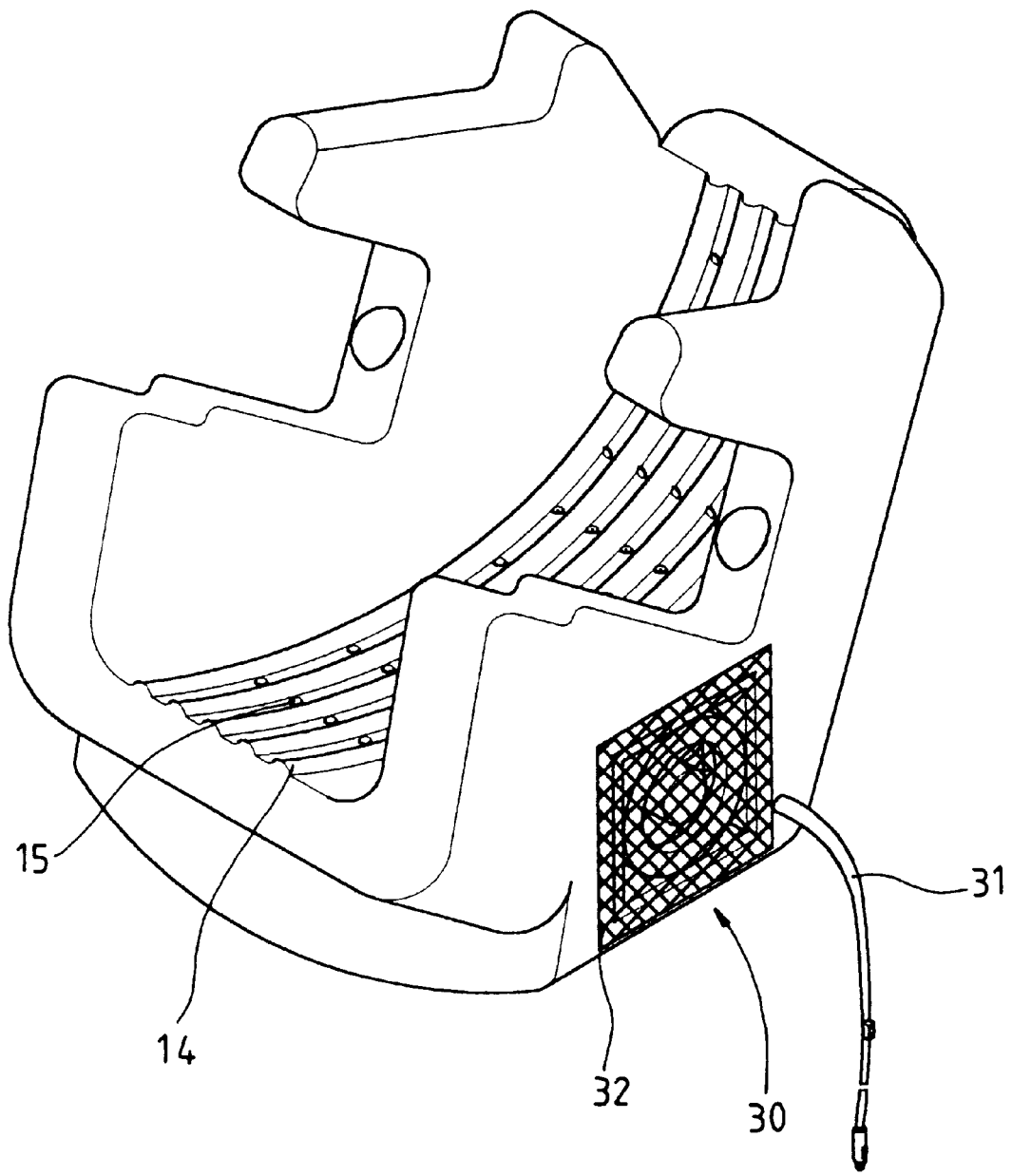
FIG. 7 is a perspective view of the baby seat in accordance with the present invention, wherein the engaging holes are sealed by two caps.
Figure 8:
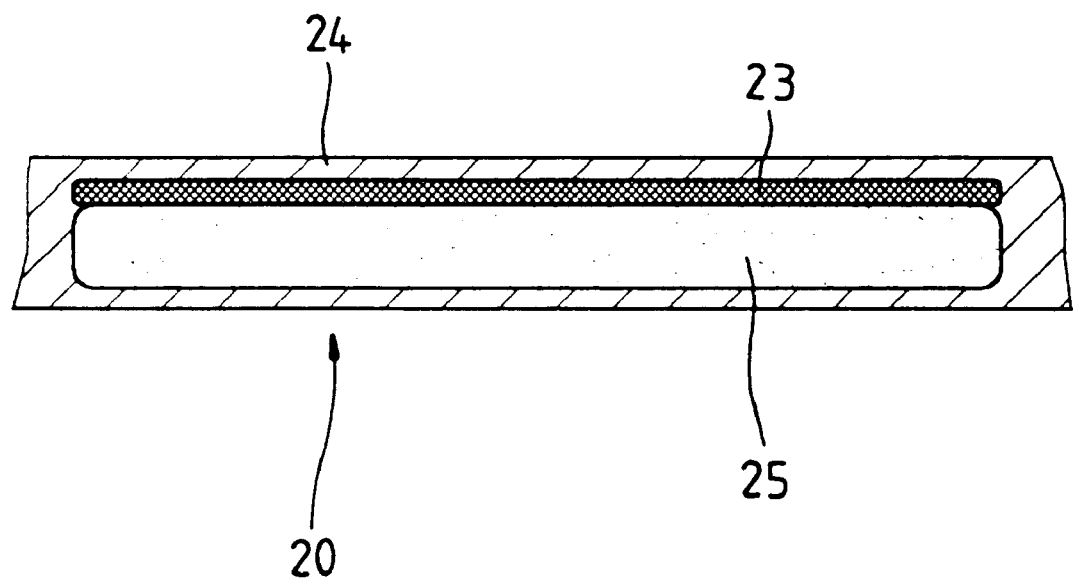
FIG. 8 is an illustrative view to show the pad having a netted member received therein.

Referring to FIG. 7, if the retaining member 40 is not used, two caps 70 are used to seal the two engaging holes 12. Referring to FIG. 8, the pad 20 includes a foam body 25 and an outer layer 24 enclosed the foam layer 25, a netted member 23 located between the foam body 25 and the outer layer 24. The netted member 23 facilitates the ventilation feature and enforces the structural strength of the pad 20.

Figure 9:
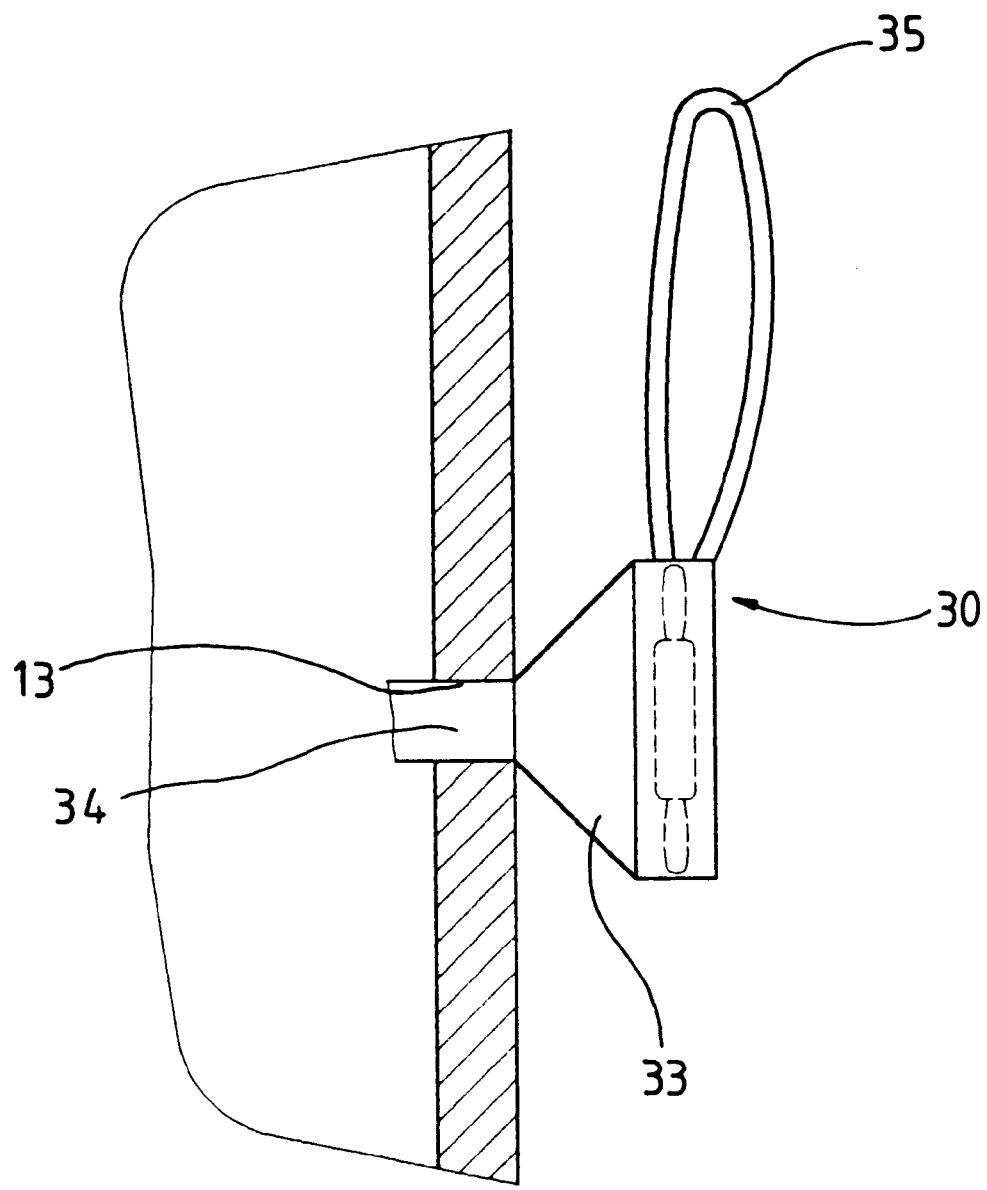
FIG. 9 is an illustrative view to show another embodiment of the ventilator engaged with the holes in the body of the baby seat of the present invention.

FIG. 9 shows another embodiment of the ventilator 30 engaged with the holes 13 in the body 10. The ventilator 30 includes a cone-shaped body 33 and a flexible tube 34 which is engaged with the hole 13 in the body 10. A ring 35 is connected to the cone-shaped body 33 of the ventilator 30. Therefore, the body 33 can be positioned a desired position by adjusting the length of the flexible tube 34.

Heat trapped between the body of the baby or kid sitting in the baby seat will be quickly dispensed by the air flow flowing through the apertures 15 defined through the body 10.

While we have shown and described various embodiments in accordance with the present invention, it should be clear to those skilled in the art that further embodiments may be made without departing from the scope and spirit of the present invention.

What is claimed is:

1. A ventilation baby seat comprising:

a hollow body having a recessed surface and two side walls extending from two sides of said body, said recessed surface of said body having a plurality of apertures defined therethrough, a hole defined through one of said two side walls and communicating with an interior in said body, and a ventilator engaged with said hole in said body.

2. The seat as claimed in claim 1 further comprising a plurality of ridges extending from said recessed surface and said apertures defined between said ridges.

3. The seat as claimed in claim 1 further comprising a retaining member removably connected between said two side walls.

4. The seat as claimed in claim 3, wherein said two side walls each have an engaging hole defined in a front end thereof and two insertions extend from a first end of said retaining member, said insertions removably engaged with said engaging holes.

5. The seat as claimed in claim 4, wherein said retaining member is a hollow member and each insertion has an inlet defined in a distal end thereof, a plurality of holes defined in a top of said retaining member.

6. The seat as claimed in claim 3, wherein said retaining member has a groove defined in a second end of said retaining member.

7. The seat as claimed in claim 6, wherein said pad includes a foam body and an outer layer enclosing said foam body, a netted member located between said foam body and said outer layer.

8. The seat as claimed in claim 1 further comprising a pad on said recessed surface of said body.

9. The seat as claimed in claim 1 further comprising a cover mounted to said hole in said body to enclose said ventilator in said hole.

10. The seat as claimed in claim 1 further comprising a slot defined in each side wall, said slot located on a rear end of said side wall.

11. The seat as claimed in claim 1, wherein said ventilator includes a flexible tube which is engaged with said hole in one of said two side walls of said body.

* * * * *